INVENTOR.
FRANK A. SELL JR.
ATTORNEYS

Jan. 16, 1962 F. A. SELL, JR 3,016,668
ARTICLE PACKAGING MACHINE
Filed July 2, 1959 11 Sheets-Sheet 2
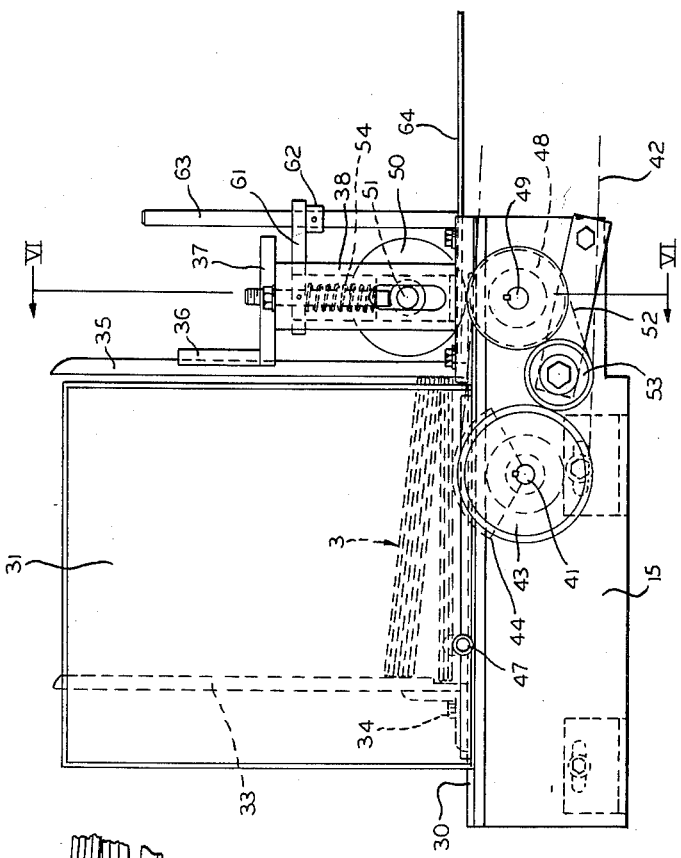
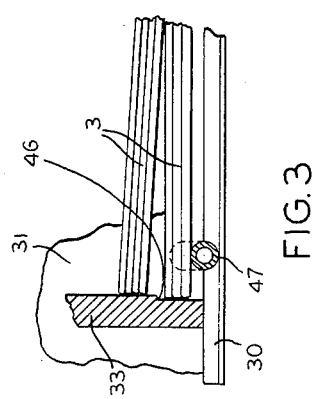
INVENTOR.
FRANK A. SELL JR.
BY
ATTORNEYS Jan. 16, 1962   F. A. SELL, JR   3,016,668
ARTICLE PACKAGING MACHINE
Filed July 2, 1959   11 Sheets-Sheet 3
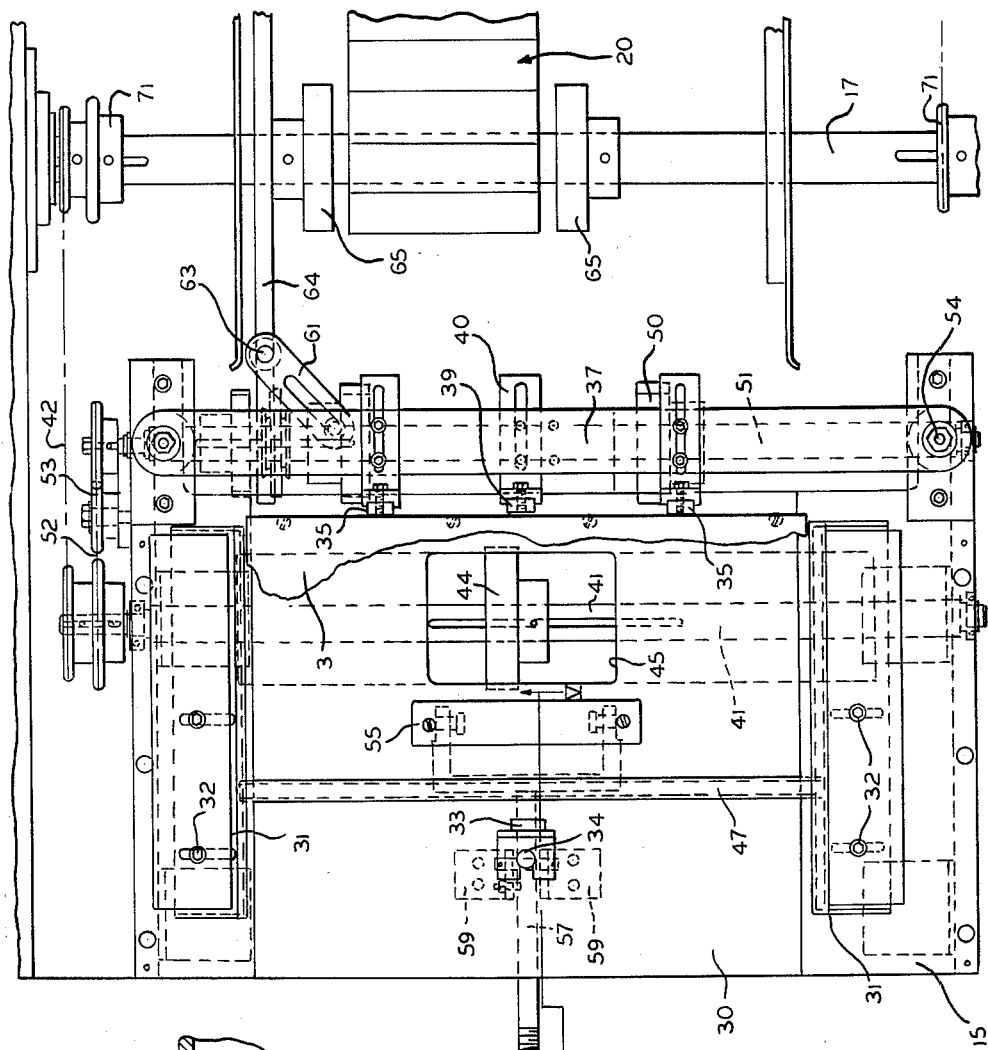
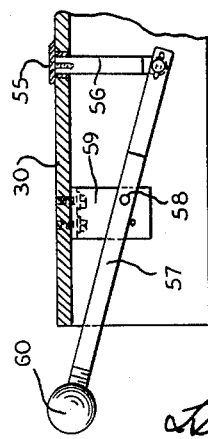
INVENTOR.
FRANK A. SELL JR.
BY
ATTORNEYS Jan. 16, 1962 F. A. SELL, JR 3,016,668
ARTICLE PACKAGING MACHINE
Filed July 2, 1959 11 Sheets-Sheet 5

INVENTOR.
FRANK A SELL JR.
BY
ATTORNEYS

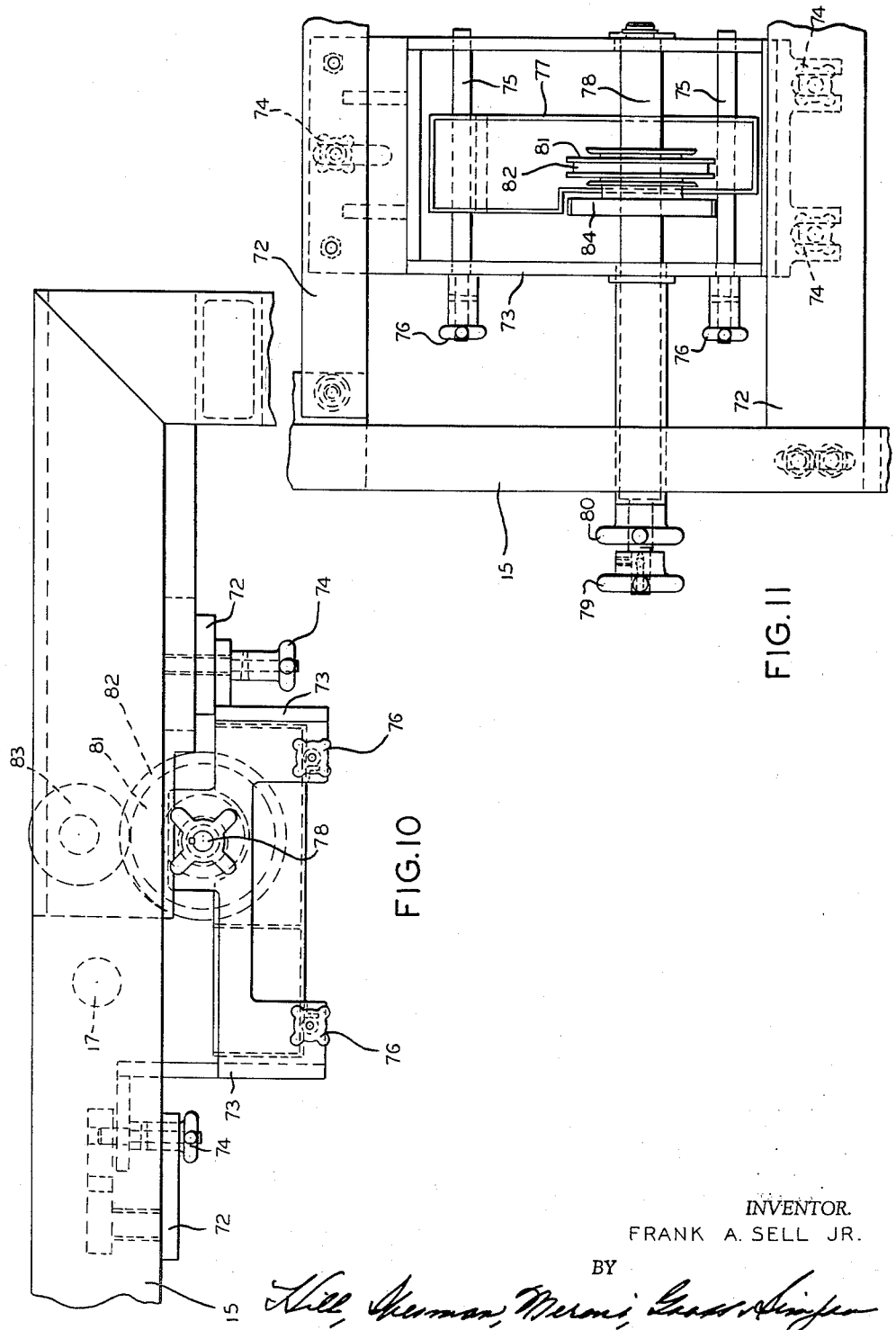

Jan. 16, 1962  F. A. SELL, JR  3,016,668
ARTICLE PACKAGING MACHINE
Filed July 2, 1959  11 Sheets-Sheet 7
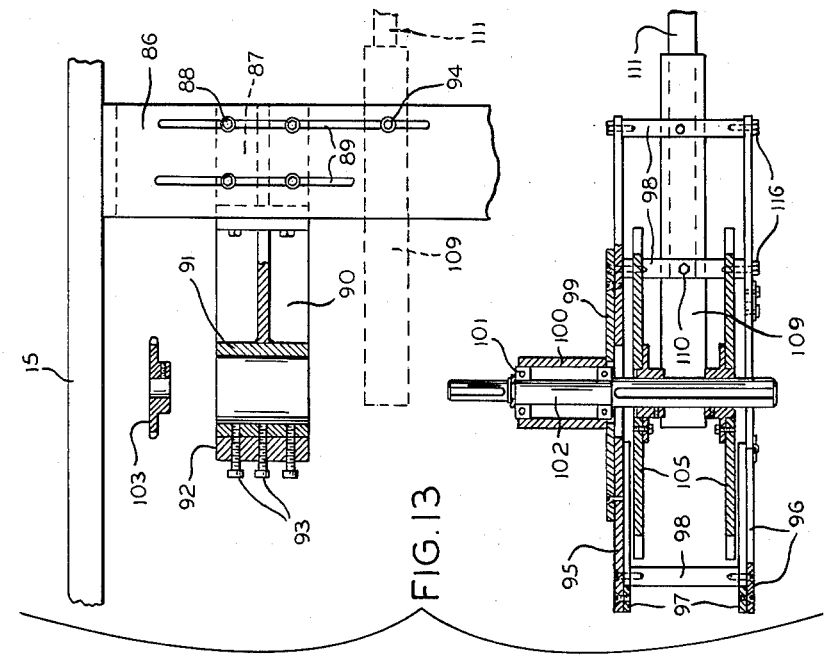
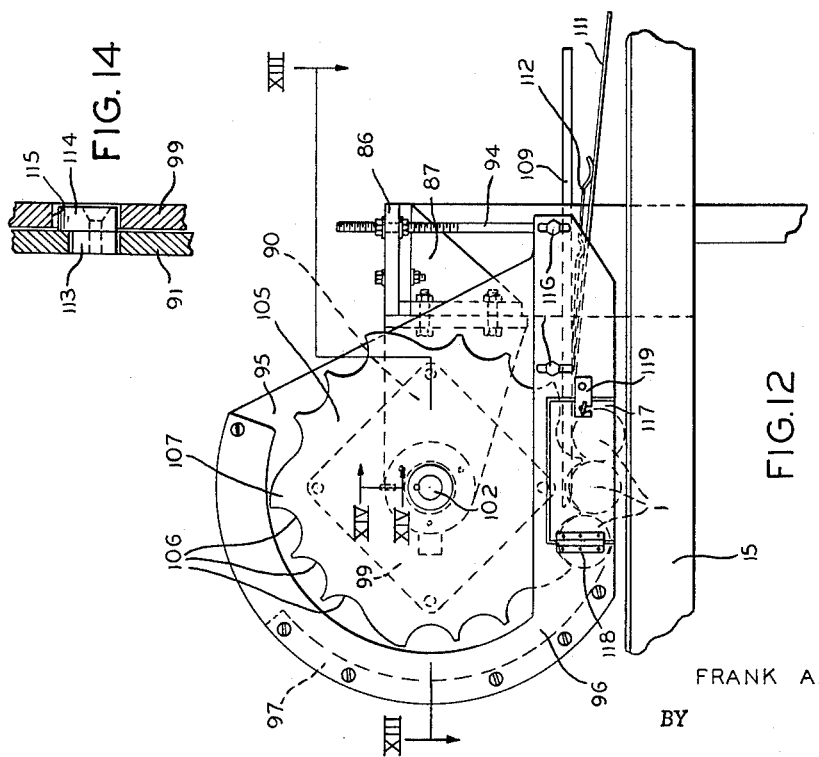
INVENTOR.
FRANK A. SELL JR.
BY
ATTORNEYS

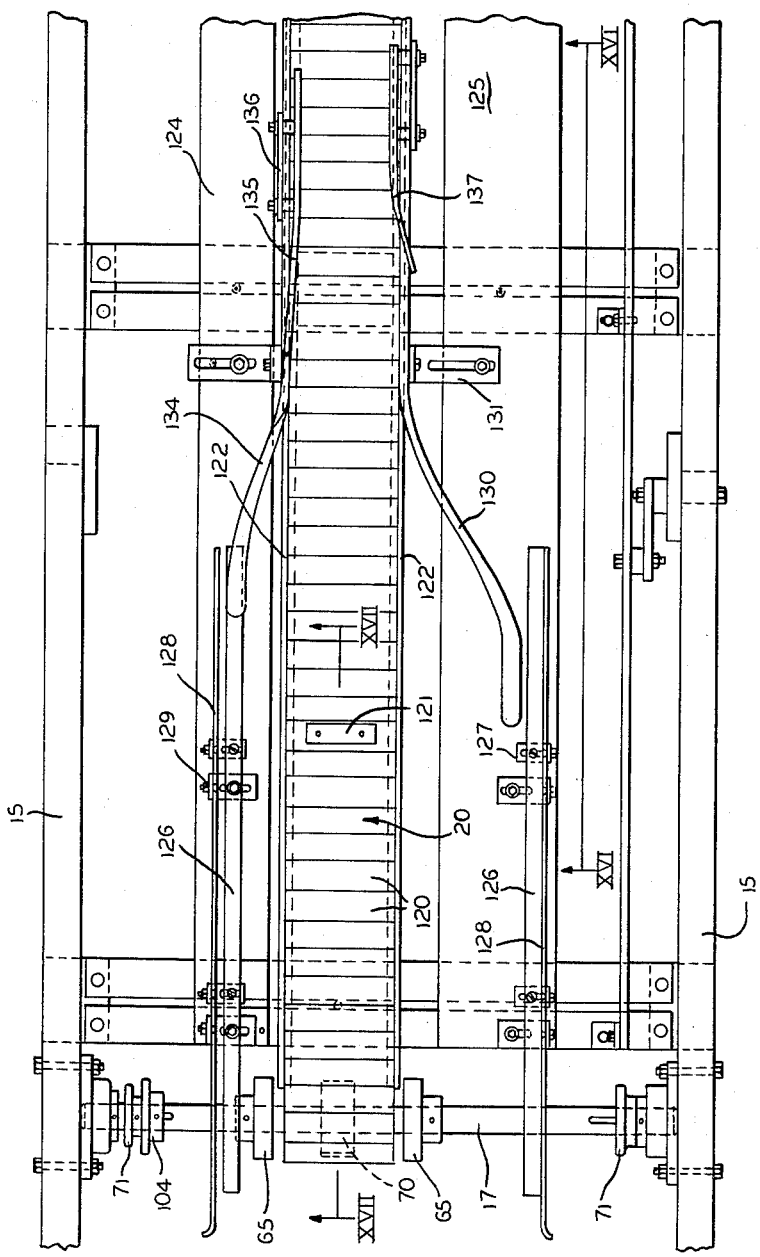

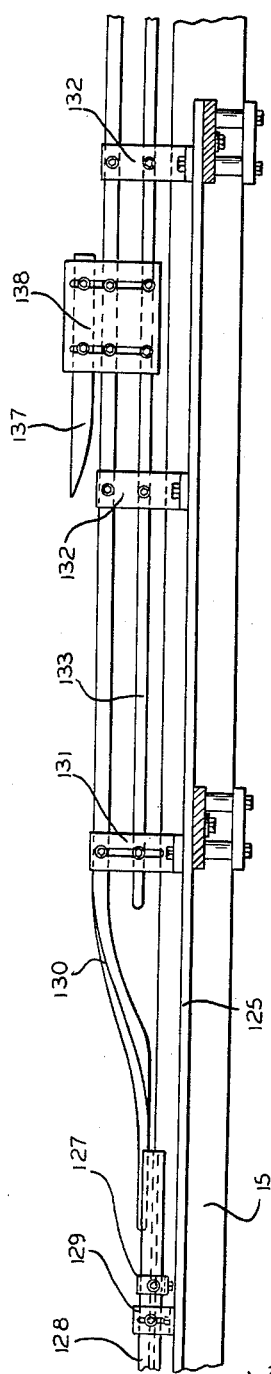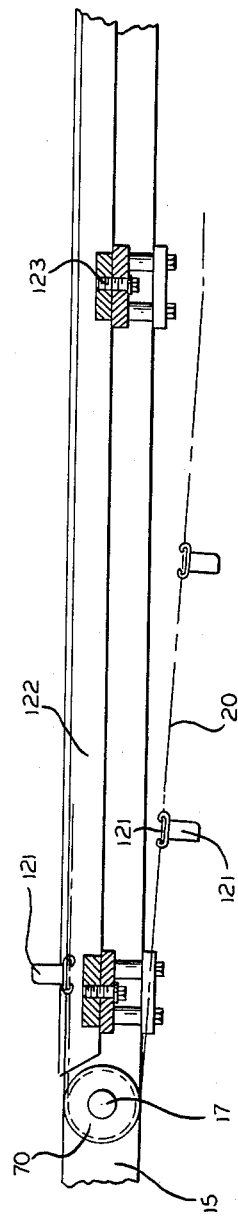

INVENTOR.
FRANK A. SELL JR.

Jan. 16, 1962   F. A. SELL, JR   3,016,668
ARTICLE PACKAGING MACHINE
Filed July 2, 1959   11 Sheets-Sheet 11
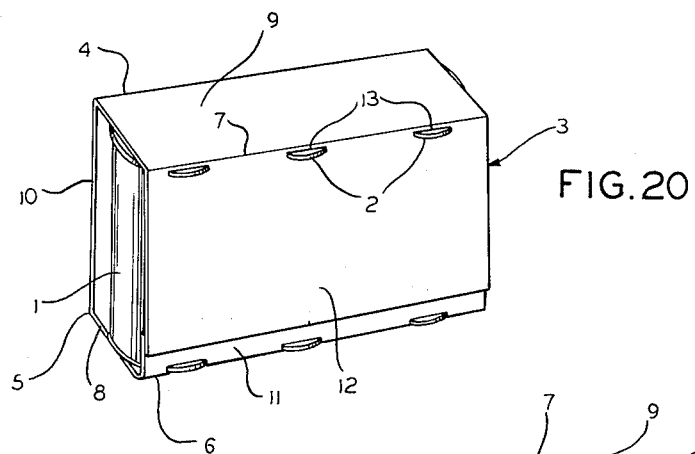
FIG.20
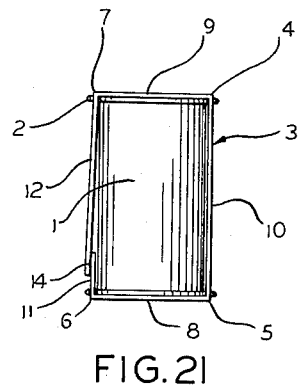
FIG.21
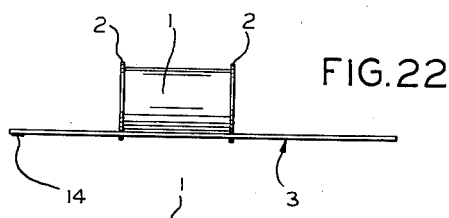
FIG.22
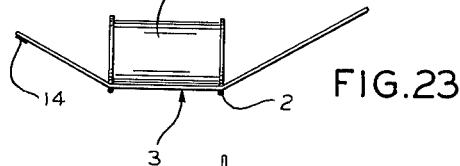
FIG.23
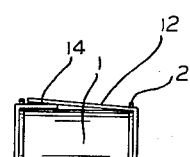
FIG.26
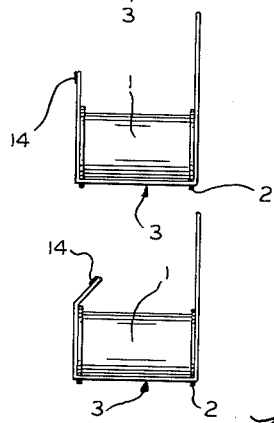
FIG.24
FIG.25
INVENTOR.
FRANK A. SELL JR.
BY
ATTORNEYS

United States Patent Office 3,016,668
Patented Jan. 16, 1962

3,016,668
ARTICLE PACKAGING MACHINE
Frank A. Sell, Jr., Schiller Park, Ill., assignor to The Precise Engineering Company, Chicago, Ill., a corporation of Illinois
Filed July 2, 1959, Ser. No. 824,545
12 Claims. (Cl. 53—186)

This invention relates to improvements in an article packaging machine, and more particularly to a machine suitable for the group packaging of unitary articles such as bottles, paperboard cans, metallic cans, boxes, and various other types of individually filled containers, the practice of the invention resulting in the grouping of a plurality of like containers in a unitary package to be purchased by the ultimate consumer, although the invention may have other uses and purposes, as will be apparent to one skilled in the art.

Retail establishments, particularly the so-called "chain" stores, grocery and department stores, and others now desire the great majority of commodities packaged in cans, bottles, and similar containers to be assembled or packaged in containers containing a predetermined number of such individual containers. Such arrangement of enclosing three, four, five, six or some other number of individual like containers in a single carton not only induces larger sales, prevents theft of individual containers, but results in a material amount of labor saving in the handling of such containers particularly in restocking shelves within the store. Obviously, a single package containing a group of like containers is easier handled by the customer in stores of the self-service type.

In the past, many and various types of machines have been developed for the group packaging of like containers, but insofar as I am aware machines of this character heretofore developed were objectionably expensive in original costs, in operation by virtue of slowness and essential manual labor, or both. When it is realized that the group packaging of articles heretofore sold or packaged in single units is an added expense to the wholesaler of the merchandise or commodity, economy in such group packaging is a prime factor for consideration. In addition, machines of this type heretofore known were not readily and easily adjustable for articles of different sizes and shapes as is desirable, were not quickly and easily alterable for varying the number of units in the group package, did not have a desirably high capacity in proportion to desired economy of construction and operation and essential floor space, were not capable of having the speed of operation readily and easily changed when necessary, and did not possess structural features consistent with rapid and automatic operation requiring minimum operator attendance.

With the foregoing in mind, it is an important object of the instant invention to provide a group packaging machine that is low in original costs, occupies a relatively small floor space, is exceedingly rapid in operation, and requires a minimum of attendance.

Another object of the instant invention is the provision of a group packaging machine of the character set forth herein which is substantially completely automatic in operation, requiring only the manual periodic supply of cartons or wrappers.

Another feature of the instant invention resides in the provision of a group packaging machine embodying carton feed means arranged to insure the feeding of only one carton at a time and which is capable of handling cartons of different widths with no more than negligible adjustment.

Another feature of the instant invention resides in the provision of a group packaging machine embodying quickly operable means to avoid the feeding of cartons in the event of jamming, leaving the machine operate without the feeding of cartons in order to clear itself.

A further desideratum of the instant invention is the provision of a group packaging machine embodying glue or adhesive metering means to insure the application of only the right amount of glue to a carton when the cartons are secured by glue or adhesive.

The group packaging machine of this invention also contemplates a structure whereby substantially any desired timing combinations for the feeding of cartons and units to be packaged may be acquired by the simple and expeditious changing of a pair of readily accessible sprocket wheels.

The invention also contemplates the provision of a group packaging machine embodying automatic means for counting and grouping units to be packaged, which means are in the form of a unitary assembly which may readily and easily be removed and replaced with another assembly whenever it is desired to change the number of units in a package or to accommodate differently sized units and packages.

Still a further feature of the instant invention resides in the provision of a group packaging machine having a unitary assembly for counting and grouping units to be packaged, which assembly is so arranged that it may be removed and replaced expeditiously and cannot be mounted askew, but only in proper position for immediate operation.

It is also an object of this invention to provide a group packaging machine so constructed that the folding of the carton automatically centers the units being packaged in the event they have become laterally out of alignment.

While some of the more salient features, characteristics and advantages of the instant invention have been above pointed out, others will become apparent from the following disclosures, taken in conjunction with the accompanying drawings, in which FIG. 1 is a fragmentary side elevational view of a group packaging machine embodying principles of the instant invention;

FIG. 2 is an enlarged fragmentary elevational view of the carton magazine and feeding mechanisms, shown at the lefthand side of FIG. 1;

FIG. 3 is a further enlarged fragmentary vertical sectional view through the rear of the carton magazine illustrating the means permitting pivoting of the cartons during individual feeding thereof;

FIG. 4 is an enlarged fragmentary plan view of the carton magazine and feeding mechanism;

FIG. 5 is a fragmentary vertical sectional view taken substantially as indicated by the line V—V of FIG. 4;

FIG. 10 is a fragmentary side elevational view of the gluing mechanism, with other parts removed;

FIG. 11 is a plan view of the under portion of the gluing mechanism, with upper parts removed;

FIG. 12 is a fragmentary side elevational view of the unit counting and grouping mechanism, with adjacent parts removed;

FIG. 13 is a plan sectional exploded view of the counting and grouping assembly taken substantially as indicated by the line XIII—XIII of FIG. 12;

FIG. 14 is a fragmentary greatly enlarged vertical sectional view of the key and slot securement of the counting and grouping assembly, taken substantially as indicated by the line XIV—XIV of FIG. 12;

FIG. 15 is a fragmentary plan view of the main track, conveyor and folding means;

FIG. 16 is a fragmentary enlarged vertical sectional view taken substantially as indicated by the line XVI—XVI of FIG. 15;

FIG. 17 is a fragmentary vertical sectional view taken substantially as indicated by the line XVII—XVII of FIG. 15;

FIG. 20 is a perspective view of a group package made by the machine;

FIG. 21 is an end view of the structure of FIG. 20;

FIG. 22 is a diagrammatic end view illustrating the initial positioning of the units to be wrapped upon a carton in the flat;

FIG. 23 is a view similar in character to FIG. 22, but illustrating the next step in the folding of the carton;

FIG. 24 is a similar view illustrating a further step in the folding of the carton;

FIG. 25 is a view just prior to the final folding of the carton; and

FIG. 26 is an end view of the completely folded carton just as the final package is ready for sealing.

As shown on the drawings:

Figure 1:
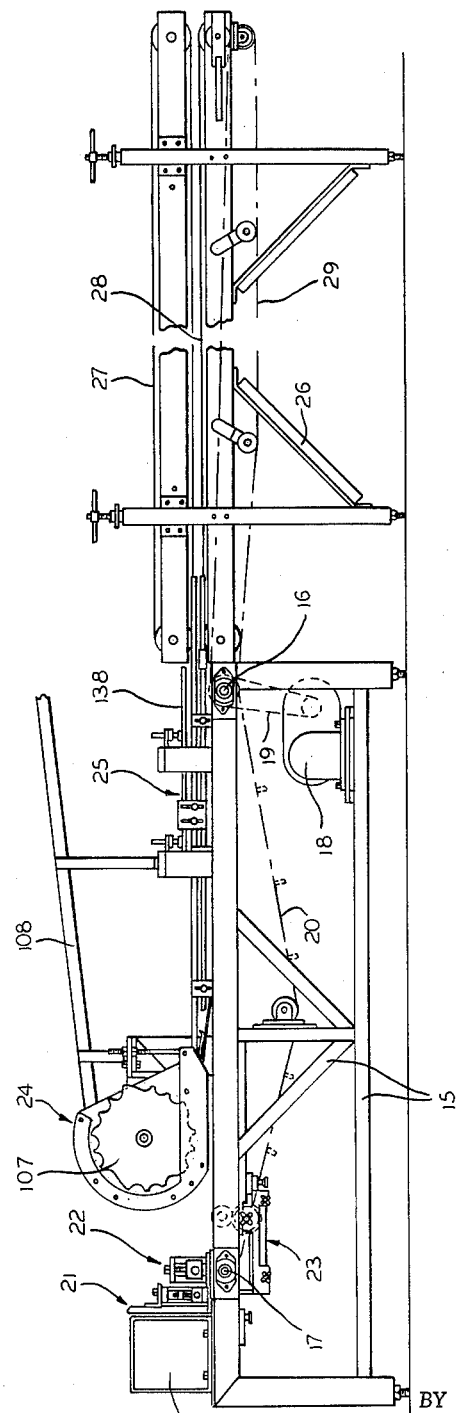

While the machine and method embodied in the instant invention may be utilized to package like units or articles in groups, substantially regardless of the size and shape of the articles, the invention will be herein disclosed and described in connection with the grouping of ordinary metallic cans of the type utilized for commodities such as canned vegetables and the like. Obviously, if bottles or cans having sloping tops are to be packaged, suitable apertures will be made in the carton for the caps of the bottles or cans to project through. It should also be noted that there are various ways of securing overlapping portions of the carton surrounding the group of units together, such as by interlocking tongues, staples, glue, etc. For purposes of simplicity and clarity, the instant invention will be described with the overlapping portions of the carton joined together adhesively.

Perhaps the instant invention will be best understood if the resultant package and the general method of obtaining it are first described.

*The package and method in general*

With reference now to FIGS. 20 through 26 of the drawings, it will be seen that the units being packaged are the commonly known form of metallic can comprising a cylindrical body portion 1 and chimes 2—2 at each end thereof holding the respective covers on the body portion. In the illustrated instance three of these cans 1 are grouped together in a single package, although it will be understood that any desired number may be so grouped depending upon the wishes of the particular retailer.

A carton or wrapper, generally indicated by numeral 3, is disposed around the group of cans 1 to maintain them in the proper grouping and provide a simple easily handled package. This carton 3 is initially a substantially rectangular piece of paperboard or equivalent material, and as indicated in FIGS. 20 and 21, is preferably provided with four spaced score lines 4, 5, 6 and 7 which extend in parallel relationship across the width of the blank, the length of the blank being transverse to the path of travel through the machine. These score lines merely define lines of fold so that the blank as it travels through the machine may be folded easily and accurately to provide the resultant wrapper which includes a bottom panel 8 underlying the ends of the cans, a top panel 9, a side panel 10, and two overlapping panels or flaps 11 and 12 which conjointly form the opposite side panel. Thus, the cans are completely encased in a rectangular open ended tubular wrapper. Adjacent each of the score lines 4, 5, 6 and 7, the carton is provided with slits as indicated at 13 properly spaced so that opposed slits are on opposite sides of the maximum diameter of each can. As the wrapper is folded about the group of cans, the chimes 2 of the cans project slightly through the slits, and thus the cans are maintained and held in position within the wrapper, which is relatively tightly wound around the group of cans.

In the packaging operation, a blank or carton 3 is first fed into position on a conveyor and a group of cans, in the illustrated instance three cans, are automatically counted and disposed on the wrapper substantially in the position seen in FIG. 22. As the assembly moves continuously through the machine, the carton passes by stationary plowshares, and initially both side portions of the wrapper are elevated as seen in FIG. 23, the folding occurring on the score lines 4 and 5. These side portions are gradually brought up substantially vertically as seen in FIG. 24, closely adjacent the ends of the cans. During this movement, should the cans become laterally out of alignment with each other, the folding of the carton automatically realigns the cans and maintains them centered and in proper position.

Prior to the initial folding of the carton, the under side of the margin on the shorter side portion is provided with a stripe of adhesive 14 which may be any satisfactory form of glue in keeping with the material of the carton. With reference to FIG. 25 now, it will be seen that the next fold occurs along the score line 6 when the smaller flap 11 is first turned in to bring the stripe of glue 14 into an exposed position. Then, the last flap 12 of the can is folded downwardly so that it overlaps the small flap 11 and the stripe of glue 14 thereon, as indicated in FIG. 26. Pressure and heat are then applied to insure good adhesion between the overlapped margins of the flaps 11 and 12, and the completed package is moved on through any suitable presser mechanism to insure completed drying of the adhesive, and is then passed out of the machine ready for packaging and shipment.

*The machine in general*

In illustrating the machine in general in FIGS. 1 through 19 of the drawings, parts have been eliminated from some figures to better illustrate parts therebehind, and in most cases the conveyor and drive chains have been indicated by dotted lines in order to simplify the drawings and avoid confusion.

The machine in general includes a suitable frame of any desired construction, designated 15, and adjacent the leading end of that frame is a main drive shaft 16, while the main driven shaft 17 is disposed substantially at the opposite end of the frame. Power may be supplied from any suitable source such as a motor 18 connected with the main drive shaft 16 by a suitable chain 19. An endless conveyor 20, to be more fully described later herein, is trained over suitable pulleys on the shaft 16 and the main driven shaft 17. At this point, it should be understood that the conveyor has its top reach flat and traveling along the bed of the machine, carrying both the carton and the cans to be wrapped therein from substantially the start of the operation to the completed package.

The complete machine embodies a combination of component assemblies each of which contributes a special function or operation toward the acquisition of the desired end result, or completed group package. With reference to FIG. 1, it will be seen that these component assemblies include a blank magazine and initial feed assembly generally indicated by numeral 21, a final feed or pull-out assembly generally indicated by numeral 22, a blank gluing mechanism generally indicated by numeral 23, unit counting and grouping mechanism generally indicated by numeral 24, and stationary blank shaping or forming mechanism generally indicated by numeral 25.

As the structure is seen in FIG. 1, it is connected at its discharge end to an elongated frame 26 carrying a pair of endless belts 27 and 28 having confronting reaches between which the successive packages are pressed until the adhesive joining the overlapping flaps 11 and 12 of the carton has had ample opportunity to firmly set. This sealing mechanism may be driven from the main drive shaft 16 by a suitable chain 29 or in any other desired manner. This particular sealing mechanism is of known construction and does not form a part of the instant invention.

*The carton magazine and initial feed mechanism*

This assembly, seen best in FIGS, 2, 3, 4, 5, 6 and 7, is the assembly generally indicated by numeral 21 in FIG. 1.

Figure 7:
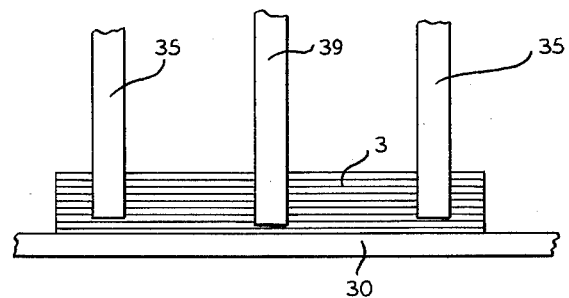
FIG. 7 is an enlarged fragmentary front elevational view of the carton magazine, with other parts removed for the purpose of clarity.

Now with reference more particularly to FIGS. 2 and 4, it will be seen that the blank magazine comprises a floor 30 mounted on the upper side rails of the frame 15, and a pair of like channel-shaped side guides 31—31 on opposite sides of the floor mounted for lateral adjustment in keeping with various blank lengths by bolt and slot connections as indicated at 32 in FIG. 4. When the blanks are stacked within the magazine between the side guides 31—31, they bear against a rear guide post 33, also mounted for longitudinal adjustment with respect to the machine as indicated at 34 by a bolt and slot connection with the floor. At the front or discharge end of the magazine the blanks are in contact with a pair of spaced side guide bars 35—35, each of which is adjustably mounted by an angle iron 36 to the cross bar 37 of a superstructure 38 mounted on top of the side rails of the frame 15. As seen in FIG. 4, the blanks 3 stacked in the magazine actually contact the side guide bars 35—35 at their leading side edges. Between the side guide bars 35—35, there is mounted a central guide bar 39 secured to an angle 40 adjustably connected with the aforesaid cross member 37. From the showing in FIG. 4, it will be noted that the guide bar 39 is spaced slightly forwardly, or in the direction of movement of the machine, of the side guide bars 35—35 so that the leading side edges of the blank do not contact the bar 39 when stacked in the magazine. Further, as seen in FIG. 7, the central guide bar 39 is longer than the guide bars 35—35, and it is the central bar which prevents more than one blank moving out of the magazine at any time. There is insufficient space between the lower end of the guide bar 39 and the floor of the magazine for two blanks to pass, and the spacing of the bar 39 forwardly of the blank edges prevents the blanks from tending to climb that bar when the lowermost blank is dispensed by feeding mechanism to be later described.

Journaled in the side rails of the frame 15 beneath the floor 30 of the magazine is a shaft 41 which is preferably driven by a suitable chain and sprocket means 42 from the aforesaid main driven shaft 17. As seen best in FIGS. 2 and 4, this shaft carries an initial feed roll 43 having a sector shaped resilient feeding element 44 thereon, this element comprising approximately ⅓ the size of the roll. The element 44 may well be made of rubber, synthetic rubber, or equivalent friction material, and the use of the sector adds to the economy of production and use of the machine, since only approximately ⅓ of the circumference of the roll is essential for feeding. The roll and particularly the feeding sector 44 thereof projects upwardly through an opening 45 in the floor of the magazine into contact with the lowermost carton 3 of the stack during the feeding movement.

Now with reference to FIG. 2, it will be seen that with each rotation of the feed roll 43 the sector shaped portion 44 will feed on blank from the bottom of the stack of blanks in the magazine. In so doing, the feed roll must elevate the lowermost blanks. In order to eliminate the full weight of the stack of blanks resting solely upon the lowermost blank, it will be seen that the rear guide bar 33 is notched as indicated at 46 near its lower end, and forward of the notched portion of this bar there is a roller 47 loosely mounted in the side guides 31—31 of the magazine, this roller resting upon the bottom of the magazine. The roller is free to rotate, and consequently the blanks may pivot on this roller when being fed out of the magazine. The roller coupled with the notch in the rear guide bar allows only three or four of the lowermost blanks to fall down to the bottom of the magazine at a time, and as the lowermost blank is fed out of the magazine, the stack thereabove which, as shown in FIG. 2, is resting against the face of the rear guide bar above the notch in a sloping position, will be jiggled so that periodically the lowermost blanks will drop off into the notch above the roller 47. This arrangement not only permits the free and rapid feeding of the blanks one at a time, but also keeps the blanks in the stack disturbed sufficiently so that they do not tend to adhere one to the other, and the weight of the stack at the forward end of the magazine provides sufficient pressure upon the lowermost blank for the feeding wheel to pass it outwardly beneath the central forward guide rod 39, the blank not tending to climb this guide rod by virtue of its spacing a little distance forwardly beyond the side guide rods 35—35.

Figure 6:
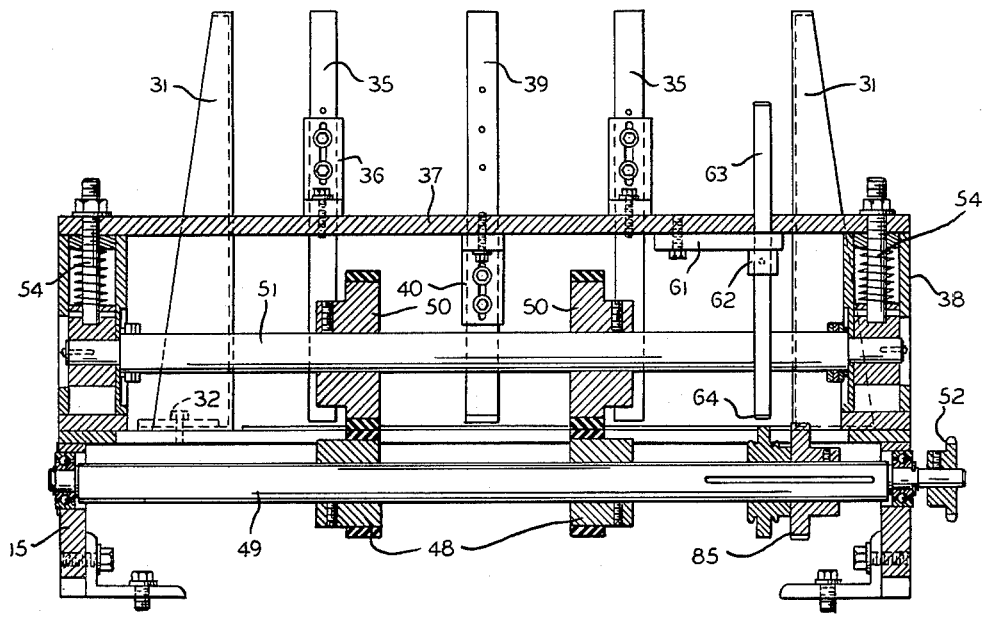
FIG. 6 is an enlarged transverse vertical sectional view taken substantially as indicated by the line VI—VI of FIG. 2.

As a blank is moved forwardly by the sector 44 on the roll 43, it is engaged by a set of initial pull-out rolls which as seen in best in FIG. 6 comprises a pair of spaced lower rolls 48—48 on a shaft 49 journaled in the side rails of the frame 15, and a pair of spaced upper rolls 50—50 on a shaft 51 journaled in the superstructure 38. With reference to FIGS. 2 and 4, it will be seen that the shaft 49 may be driven by a suitable chain and sprocket arrangement 52 from the shaft 41, there preferably being a take-up sprocket 53 in this drive connection. As seen in FIG. 6, the rolls 48 and 50 are preferably surfaced with rubber or equivalent material so as to provide a positive engagement of the blank therebetween. The upper shaft 51 is spring biased downwardly at each end indicated at 54—54 in order to provide pressure between the rolls 48 and 50. Now it will be noted that the sector 44 on the feed roll 43 contacts the undermost blank of the stack ahead of the transverse center line of the carton or blank and moves it forwardly into almost immediate engagement by the feed rolls 48 and 50. Thus, the blank is literally pulled from the magazine rather than being pushed therefrom and the feed is quicker, more positive and accurate. It should also be noted that the timing of the feed can readily be altered to obtain any desired timing combination by the simple changing of the readily accessible sprockets in the drive system 52 on the ends of the shafts 41 and 49.

While there is little possibility of jamming occurring during the progress of the blanks through the instant machine, nevertheless jamming for some reason or another does occur once in awhile in a wrapping machine of this type. When a jam occurs, the feeding of more blanks against those jammed only results in increasing the effect of the jam, whereas if the machine could operate without more blanks being fed toward the jam, the machine could readily clear itself and a minimum of damage and delay would result. With that thought in mind, the instant machine is provided with a stack lifting arrangement, manually operated, which might be utilized to very quickly elevate all of the blanks in the magazine so that none of them can be acted upon by the feeding mechanism.

The mechanism for this purpose is best seen in FIGS. 4 and 5, and comprises a platform or plate 55 resting on the floor 30 of the magazine. As seen in FIG. 5, this plate is connected to the upper ends of a pair of spaced rods 56 extending through suitable apertures in the magazine floor. These rods are connected to the furcation ends of a bifurcated lever 57 pivoted as at 58 to a pair of brackets 59—59 on the under side of the magazine floor. The outer end of the lever carries an operating handball 60 by means of which it is a simple expedient for the operator to press down upon the lever, thus causing the platform 55 to elevate all of the blanks within the magazine. Any suitable form of spring retention means to hold the stack of blanks elevated may be utilized if desired, but usually it is merely necessary for the operator to hold the blanks elevated for a short period of time, until the machine clears itself of the jam.

Now with reference again, particularly to FIGS. 2, 4 and 6, it will be seen that a bracket 61 has a collar 62 welded to the bottom thereof. This bracket is secured to the under side of the cross member 37 of the superstructure 38 and the collar adjustably carries a vertical rod 63 to the bottom end of which is attached a blank top guide 64 in the form of a strip extending along the line of movement of a blank from the magazine passing through the machine. This top guide 64 serves as a back-up member when the aforesaid stripe of glue 14 is applied to the bottom marginal edge of the blank, by gluing mechanism to be later described.

The final blank feed means or pull-out rolls

Figure 9:
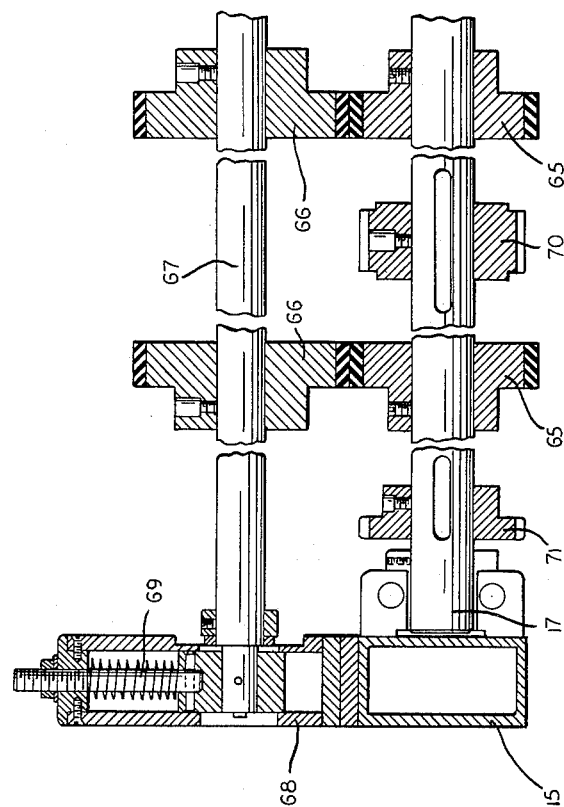
FIG. 9 is a fragmentary vertical sectional view taken substantially as indicated by the line IX—IX of FIG. 8.
Figure 8:
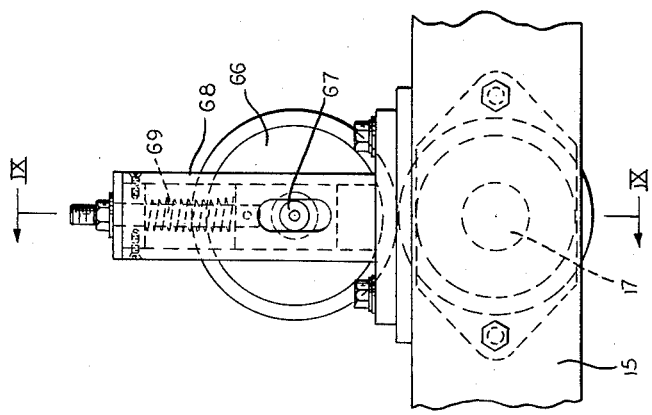
FIG. 8 is a fragmentary side elevational view of the final magazine pull-out or final feed rolls.

The final blank feeding mechanism is best seen in FIGS. 8 and 9, and is the structure generally designated by numeral 22 in FIG. 1. However, the elevational view of FIG. 8 is taken from the opposite side of the machine seen in FIG. 1.

The aforesaid main driven shaft 17, journaled to the side rails of the frame 15, carries a pair of spaced feed rolls 65—65 which cooperate with a pair of similar feed rolls 66—66 carried on a shaft 67 disposed above the shaft 17 and journaled at each end in a superstructure 68. The shaft 67 is biased downwardly by spring means 69 at each end thereof so as to establish pressure between the feed rolls 65 and 66. These rolls are preferably covered with rubber or equivalent gripping means so as to effect a positive pull on the blank being fed.

The first and second sets of feed rolls are preferable to accommodate cartons of various widths so that the same machine may be utilized for a number of carton sizes without requiring a change in the feeding mechanism. For example, the first set of feed rolls will move a narrow carton to the second set of feed rolls, and slippage is overcome and a quick positive pull given upon the carton being fed.

As also seen in FIG. 9, the shaft 17 carries a sprocket 70 for the aforesaid conveyor 20 (FIG. 1) which carries the carton as well as the cans through the machine during the wrapping operation. In order to eliminate the conveyor itself driving the shaft 17, it is preferable to provide that shaft with a pulley 71, at each end thereof if so desired, and connect such pulleys by suitable chains to similar pulleys carried on the main drive shaft 16 (FIG. 1). Such arrangement avoids any special load being imposed upon the conveyor that might interfere with its smooth action and proper timing.

The gluing mechanism

The mechanism for applying the stripe 14 of glue to the underside of a marginal edge of each blank is best seen in FIGS. 10 and 11, and is the mechanism designated generally by numeral 23 in FIG. 1. At the outset it should be noted that this particular gluing mechanism may be disposed in substantially any desirable location in advance of the deposition of cans or units to be wrapped upon the carton as it travels through the machine. In some instances it may be desirable to locate the glue mechanism with the applying wheel disposed substantially beneath the shaft 49 of the first set of feed rolls; and in other instances it might be desirable to locate it with the glue applying wheel beneath the shaft 17 at the second set of feed rolls, but for illustrative purposes and in order to present a clear view of the mechanism, I have elected to show it herein as disposed ahead of the second set of feed rolls in the direction of travel of the carton.

The gluing mechanism is secured to a pair of subframe members 72—72 atached to an upper side rail of the main frame 15. The mechanism includes a supporting frame 73 held in position on the members 72—72 by three hand operable locking knobs 74. This supporting frame 73 has a pair of gluepot mounting rods 75—75 extending thereacross and maintained in position by hand knobs 76—76. These rods support a gluepot 77 through which a shaft 78 extends which is journaled in the sides of the supporting frame 73. This shaft is adjustable by means of a hand knob 79 and may be locked in position by a knob 80.

Eccentrically mounted on the shaft 78 is a glue pick-up wheel 81 having a groove in its circumference as seen at 82. A glue applying wheel 83 rides inside the groove 82 of the eccentrically mounted pick-up wheel. The sides of the groove wipe the circumferential margin of the applying wheel 83 and keep that wheel in a clean condition. The eccentricity of the wheel 81 causes this wheel to receive the applying wheel in the groove only to a predetermined extent, and thus the amount of glue actually applied to a carton passing over the applying wheel 83 is metered to a desired amount.

A pulley or sprocket wheel 84 is concentrically mounted on the shaft 78, and may receive its drive from a pulley or sprocket 85 on the aforesaid shaft 49 carrying the first set of feed rolls (FIG. 6). The gluing mechanism thereby will operate in synchronism with the feeding rolls so each blank passing over the roll 83 will receive just the required amount of glue.

The can counting and grouping mechanism

The mechanism for dividing the cans into groups of a predetermined number each is that generally designated by numeral 24 in FIG. 1, and is best seen in FIGS. 1, 12, 13 and 14.

This mechanism embodies a superstructure 86 suitably mounted on the frame 15 and to the under side of which is attached an adjustable bracket 87 by means of a series of bolts 88 extending through slots 89 in the top bar of the superstructure. Secured firmly to the bracket 87 is a longitudinally extending mounting bracket 90 having a smoothly bored hub 91 on the end thereof. Welded to the hub is a block 92 carrying a series of set screws 93 of any desired number, there being three shown in the illustrated example. Also, an elongated supporting bolt 94 extends through one of the slots 89 in the superstructure for a purpose that will later appear. The structure so far described comprises the fixed supporting means for the counting and grouping unit or star wheel assembly now about to be described.

The removable and replaceable star wheel assembly includes a can guide box comprising a back plate 95, a front plate 96, and a similar inside track 97 secured to the arcuate inner face of each of the plates 95 and 96. The plates 95 and 96 are maintained spaced apart by a plurality of spacer bars 98 bolted to the respective plate at each end thereof. The plates 95 and 96 and the inside tracks 97 may be made of suitable non-metallic material containing a thermosetting plastic, if so desired.

Secured to the back or external face of the plate 95 is a substantially square metallic plate 99 to which a mounting hub 100 is welded. This hub is of a size to telescope inside the fixed hub 91 on the bracket 90, and be held in proper position therein by means of the set screws 93. The mounting hub contains bearing means 101 for a shaft 102 to the inner end of which a suitable pulley or other drive wheel 103 may be attached, and this pulley may be connected by any suitable chain or the like to a pulley 104 (FIG. 15) on the main driven shaft 17, or it may be driven from any other suitable location on the machine.

The outer end of the shaft 102 carries a star wheel comprising a pair of spaced like star wheel plates 105—105 which are preferably made of non-metallic material containing a thermosetting plastic. The two star wheel members 105 are spaced apart sufficiently to engage the body of a can inside the chimed ends of the can. Looking at FIG. 12, it will be seen that the star wheel members are provided with a plurality of recesses 106, and in the illustrated instance the recesses are arranged in groups of three each separated by a wider tooth 107 to provide adequate spacing between the groups of three each. Cans to be group packaged may be delivered to the star wheel through a chute 108 seen in FIG. 1 from any source of supply, and as they gravitate into the rotating star wheel, the cans lodge in the recesses 106 and are deposited upon a carton at the bottom of the wheel as indicated by dotted lines showing the deposition of a group of three cans. The following group of three cans will be spaced slightly behind the preceding group by virtue of the wider tooth 107 on the star wheel.

As will be more fully explained later, both the carton and a deposited group of cans are moved along by means of a pushing lug on the conveyor forming the bed of the machine. Means are provided to insure the proper positioning of the cans and to prevent the cans from rolling ahead on the conveyor after being deposited on the carton by the star wheel. These means are included in the star wheel assembly and comprise a can guide plate 109 beneath which the cans are deposited by the star wheel. This guide plate is bolted to the intermediate spacer bar 98 as indicated at 110 in FIG. 13, and is also connected to the lower end of the aforesaid elongated bolt 94 when the star wheel assembly is mounted in position on the supporting bracket 90. Attached to the underside of the can guide plate 109 by the same bolt 110 is a depending spring plate 111 which is backed up by a suitable leaf spring 112. The spring elements 111 and 112 are connected at one end only by the bolt 110, and extend downwardly at their front end by virtue of their inherent resiliency toward the path of travel of the cans. The cans must travel underneath the spring plate 111 as they are urged along by the conveyor, and the pressure of this spring plate delays the cans and holds them back until they are properly engaged by the conveyor lug which then readily forces the carton and group of cans forwardly against the delaying action of the spring plate 111.

The star wheel assembly above described may be secured to the hub 91 of the mounting bracket 90 by means of the set screws 93 and the guide plate 109 is connected to the elongated bolt 94 as indicated by the dotted line showing in FIG. 13. Obviously, to remove the complete star wheel assembly it is only necessary to release the bolt 94 and loosen the set screws 93, whereupon a substitute star assembly may be easily mounted to replace the first assembly. The star wheel assemblies may be changed whenever it is desired to package cans of smaller or larger size, or when it is desired to change the number of cans in a group. Looking at FIG. 14, it will be noted that the hub 91 is provided with a key 113 having an enlarged oval or equivalently shaped head 114 which enters a suitable slot 115 in the mounting plate 99 of the star wheel assembly. Thus, it is impossible to mount the star wheel in any but the correct position, thus avoiding numerous readjustments that would otherwise have to be made with each change of a star wheel.

Should it be necessary to make a minor adjustment in a star wheel by virtue of slightly oversized cans, it is a simple expedient to properly space the can guide plate 109 by means of the bolts 116 which engage the spacer bars 98 and extend through slots in the front plate 96 of the can guide box. Thus, for variations in can size of a small nature, it is not necessary to change the complete star wheel assembly.

In order to permit an attendant to check the operation of the star wheel assembly at any time, an opening is provided in the plate 96 of the can box guide at the point of deposition of cans by the rotating star wheel. This opening is closed by a door 117 hinged to the plate 96 as at 118, and which is kept shut by a simple form of latch 119. An attendant may open that door at any time and check the actual deposition of the cans upon a carton without in any manner disrupting operation of the machine.

*The container forming or folding mechanism*

This mechanism, designated in general by numeral 25 in FIG. 1, is best seen in FIGS. 15, 16, 17, 18 and 19.

The conveyor which moves the carton and deposited cans through the forming mechanism may be of any suitable construction, but is preferably a series of flat links disposed in close proximity to each other as indicated at 120 in FIG. 15. Spaced along this conveyor at suitable distances are lugs 121 which may be attached to a link by flexible members extending through suitable slots in the link. Along each side of the conveyor is a guide rail 122 each of which is suitably anchored to cross members of the frame 15 as indicated at 123 in FIG. 17.

Outward of the conveyor guides 122—122 the frame is provided with longitudinally extending bed plates 124 and 125. A carton guide bottom track 126 is adjustably connected to each of these bed plates as indicated at 127. A carton guide side track 128 is adjustably connected to each of the bed plates as indicated at 129. Thus, two guide tracks are formed on opposite sides of the conveyor track to guide the end edges of the carton as it is carried along by the conveyor lugs with the deposited group of cans thereon. Immediately after deposition of the cans on the carton by the star wheel, the cans will be resting on the carton substantially as seen in FIG. 22. As the assembly is moved along by the conveyor, the longer side of the carton, the righthand side as viewed in the direction of travel, first contacts a stationary plow 130 of such shape as to elevate the righthand portion of the carton to the position seen in FIG. 23 and thence to the vertical position of FIG. 24. This plow, as seen in FIG. 16, is adjustably secured to a slotted bracket 131 mounted on the bed plate 125. Other brackets 132—132 are also connected with the plow 130 and between the higher portion of that plow and the bed of the machine these brackets carry a guide rail 133. The horizontal and higher portion of the plow 130 itself may also function as a guide rail after the carton portion is elevated to vertical position. The plow is of course stationary and the blank merely rubs thereon during its travel.

Shortly after the righthand portion of the carton begins its upward folding movement, the lefthand portion of the carton bearing the glue stripe 14 contacts a similarly mounted plow 134 on its side of the path of travel so that it is being upwardly folded through the position of FIG. 23 to the vertical position of FIG. 24 along with the righthand portion. Then the lefthand portion contacts another higher disposed plow 135 mounted on a bracket 136 adjustably connected with the guide rails, and is first turned inwardly to the position seen in FIG. 25; this inward folding of the lefthand portion gradually increases as it travels along the plow 135 until it is bent over on top of the cans as seen in FIG. 26. While this lefthand portion is being turned down over the upper sides of the cans, the righthand portion contacts a plow 137 mounted on a similar bracket 136, and is folded down from the position of FIG. 25 to the position of FIG. 26 on top of the folded lefthand portion to overlie the stripe of glue 14 as shown in FIG. 26. Thus, the carton is completely and relatively tightly wound around the cans, and the chimes of the cans project a short distance through the slits 13 in the carton, whereby the cans are effectively retained in position.

Should any of the cans become out of alignment laterally during the movement of the assembly on the conveyor, that misalignment is automatically corrected by the folding of the sides of the carton as they pass along the respective plows.

Figure 18:
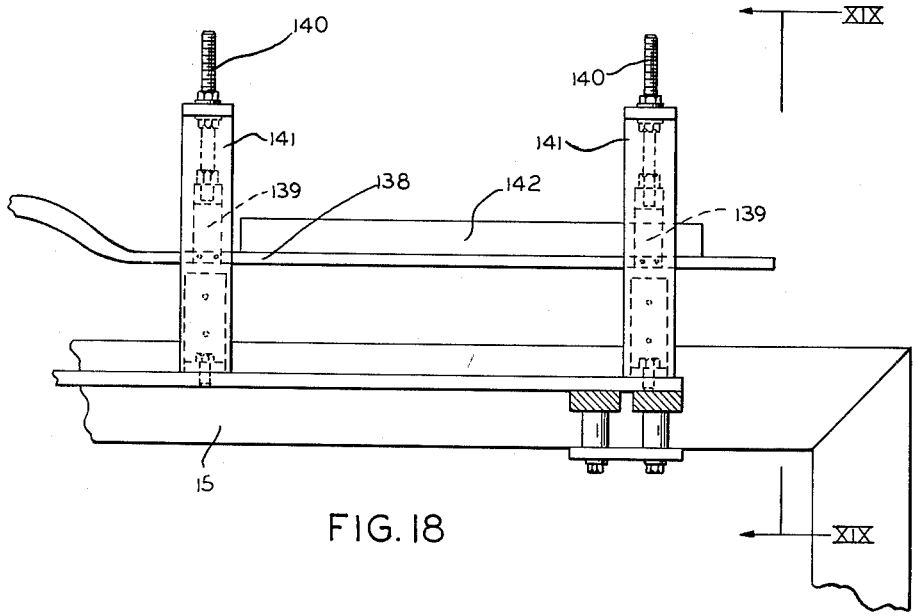
FIG. 18 is a fragmentary side elevational view of the top plow and carton sealing means.
Figure 19:
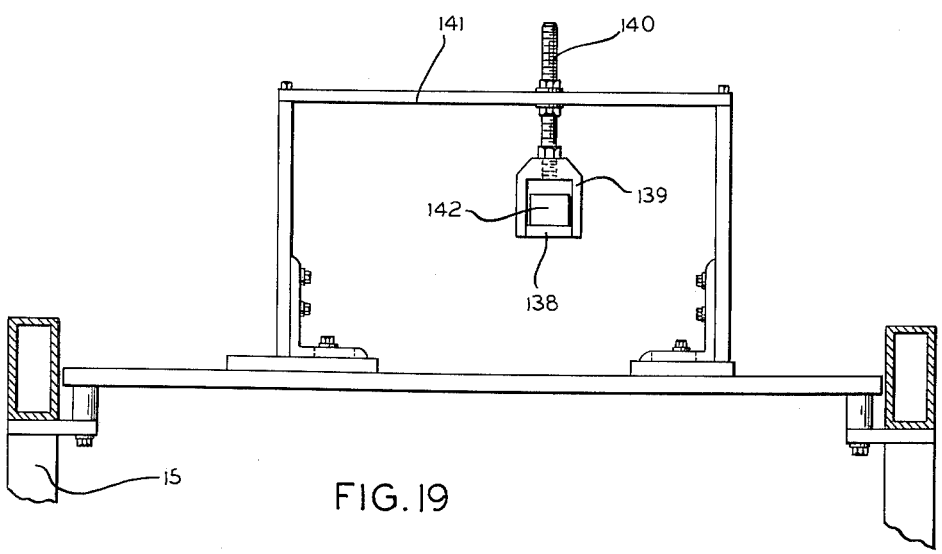
FIG. 19 is a fragmentary vertical sectional view taken substantially as indicated by the line XIX—XIX of FIG. 18.

The final sealing of the carton around the cans is accomplished by an overhead plow 138 seen in FIGS. 18 and 19. This plow 138 is preferably held in a pair of inverted stirrups 139—139 each of which is adjustably suspended on a bolt 140 connected with a top bar of the superstructure 141 mounted on suitable members attached to the frame 15. The plow is positioned to bear on the carton directly above the overlap of the panels 11 and 12 and the adhesive stripe 14. In order to insure adequate and relatively rapid setting of the adhesive, the plow is preferably provided on its top with an electrical heating element 142 of any suitable character to transmit a relatively high temperature to the plow itself. After the now completed package passes from under the plow 138, it enters between the confronting reaches of the soft conveyor belts 27 and 28 in the sealing mechanism seen at the righthand portion of FIG. 1.

The movement of the carton and then the carton and the cans through the entire mechanism is continuous.

*Summary of operation*

A this point, it is simply necessary to briefly summarize the operation of the machine, since the operation of the individual components of the machine has been above discussed.

After the machine has been equipped with the properly sized star wheel and the magazine has been adjusted to accommodate the proper size of blanks or cartons, the machine is started. The sectored feed wheel 43 then moves out the lowermost blank from the stack in the magazine, with only the weight of the stack at the forward edge of the blank, and at the same time jiggles the blanks in the stack in order to maintain them properly separate one from the other. The blank moving out through the space beneath the center guide bar 39 is almost immediately engaged by the first set of feed rolls and rapidly passed thereby to the second set of feed rolls. Contemporaneously with this movement of the blank, the gluing roll applies a metered amount of glue to the underside of the lefthand blank margin. The rear edge of the blank is next advanced by a lug on the conveyor and the blank is advanced beneath the star wheel in position to receive a group of a predetermined number of cans thereon. The spring elements on the star wheel assembly brake the movement of the cans so that they are in proper alignment on the carton, and the assembly is advanced through the machine by the lug on the conveyor past the various plows until the carton is shaped into boxlike formation around the cans, the final plow not only pressing the overlapped portions of the carton together to firmly set the glue, but also applying heat to cause more rapid hardening of the glue. The finished carton then travels through the sealing mechanism and is discharged ready for shipment or storage.

During the operation of the machine, it is only necessary for an attendant to periodically supply the magazine with a stack of blanks. All the rest of the operation is automatic, and should the attendant wish to inspect the operation at any time the door 117 in the star wheel assembly permits accurate inspection at the most critical point, without interrupting the operation of the machine.

The cans to be packaged in groups may be automatically supplied to the machine by way of the gravity feed chute 108. This chute can well lead to an upper floor in a building where the cans are filled and sealed, and after the cans leave the filling and sealing machines they can gravitate down the chute directly into the instant packaging machine. It is not necessary to have a packaging machine for each can filling and closing machine, because of the rapidity of operation of the packaging machine. Several can filling and closing machines would be necessary to supply the packaging machine, since it can produce complete group packages in excess of 125 per minute.

From the foregoing, it is apparent that I have provided an economical, highly automatic, extremely rapid, and efficient group packaging machine requiring a minimum of attendance. Further, the machine may be readily adjusted in a simple and highly expeditious manner to accommodate cans, bottles, or other unitary articles of different sizes and shapes. During operation, all parts of the machine may be readily and easily inspected. It should also be noted that the machine is simple in construction, highly durable, and occupies a very small amount of floor space.

It will be understood that modifications and variations may be effected without departing from the scope of the novel concepts of the present invention.

I claim as my invention:

1. In a group packing machine having means to deposit a number of units to be wrapped on a carton and forming the carton about said units as the carton and units travel along, a carton blank magazine to hold a stack of flat cartons, said magazine being defined by side members, spaced front bar members, and a rear bar member, at least one of said front bar members being of a length to prohibit the exit of any but the lowermost carton therebeneath at a time, the rear bar member having an inside notch at the lower end thereof of a height to accommodate several cartons, the remainder of the cartons in the stack resting against said rear bar member above said notch in a downwardly and forwardly inclined position, and a feed roll beneath said magazine disposed to elevate the forward part of the stack as it contacts and feeds the lower carton whereby other cartons are jiggled and periodically drop into said notch and the full stack weight is not on the lower carton.

2. In a group packing machine having means to deposit a number of units to be wrapped on a carton and forming the carton about said units as the carton and units travel along, a carton blank magazine to hold a stack of flat cartons, said magazine being defined by side members, spaced front bar members, and a rear bar member, at least one of said front bar members being of a length to prohibit the exit of any but the lowermost carton therebeneath at a time, the rear bar member having an inside notch at the lower end thereof of a height to accommodate several cartons, the remainder of the cartons in the stack resting against said rear bar member above said notch in a downwardly and forwardly inclined position, a free roller in the magazine under the carton stack in advance of the rear bar member on which the lower cartons of the stack may pivot during the feeding of the lowermost carton, and a carton feed roll projecting slightly above the bottom of the magazine to contact and elevate the lowermost blank as it is fed from the carton.

3. In a group packaging machine, a frame, a conveyor travelling the bed of said frame, a carton magazine at one end of said frame in advance of the conveyor, feeding means to successively feed cartons from said magazine one at a time at intervals onto said conveyor, means to deposit a group of units to be packaged on each fed carton, forming means to fold each carton about the group of units thereon, and manually operable means to move the cartons in said magazine out of feeding position in the event the machine becomes jammed.

4. In a group packaging machine, a magazine for a stack of unfolded cartons, means to successively feed blanks from the bottom of the stack at intervals, means to carry fed blanks along a path, means to deposit a group of articles to be packaged on each blank, means along said path to fold each carton about its group of articles, and manually operable elevating means to raise the carton stack in the magazine out of feeding position when desired while the machine otherwise continues operation.

5. In a group packaging machine, a magazine for a stack of unfolded cartons, means to successively feed blanks from the bottom of the stack at intervals, means to carry fed blanks along a path, means to deposit a group of articles to be packaged on each blank, means along said path to fold each carton about its group of articles, a platform in the bottom of said magazine, and a pivoted lever to elevate said platform and the stack of cartons out of feeding position while the machine otherwise continues operation.

6. In a group packaging machine having means for feeding a carton and transporting the same along a path while folding the carton about a group of articles and gluing overlapping portions of the carton together, gluing means for applying glue along a margin of a carton as the carton moves thereby, said gluing means comprising a glue pot, an eccentrically mounted glue pick-up wheel having a groove in its circumferential edge, and a glue applying wheel of a size to enter said groove and also contact the marginal portion of a passing carton, whereby said applying wheel is maintained clean at its circumferential edges and receives a metered amount of glue from said pick-up wheel by virtue of the eccentricity of the latter.

7. In a group packaging machine, a conveyor to carry unfolded cartons in spaced relationship therealong, a star wheel assembly above said conveyor, said assembly including an article guide box, a star wheel rotatable in said guide box and having a configuration to receive a number of articles to be wrapped in groups and deposit a group on each passing carton, a normally closed door on said guide box adjacent the point of deposition of articles on a carton to permit inspection while the machine continues operation, and resilient braking means extending from said guide box to align each group of articles with its carton, and forming means along the conveyor path to fold each travelling carton about its group of articles.

8. In a group packaging machine, a conveyor to carry unfolded cartons in spaced relationship along a path of travel, a carton magazine, feeding means to periodically deliver a carton from the magazine to the conveyor, a fixed star wheel assembly comprising an article guide box and a star wheel arranged for rotation in said box and shaped to separate articles into groups each of which includes a plurality of articles and deposit a group on each carton passing by on said conveyor, and forming means along the path of said conveyor to fold each carton around its group of articles, said magazine including a base having slots therein and spaced upstanding bars laterally adjustable in said slots, mounting means connected to a fixed part of said machine, and supporting means on said guide box removably engageable with said mounting means, whereby the star wheel assembly is removable and replaceable as a unit and the magazine is adjustable for the accommodation of differently sized articles and blanks.

9. In a group packaging machine, a conveyor to carry unfolded cartons in spaced relationship along a path of travel, a carton magazine, feeding means to periodically deliver a carton from the magazine to the conveyor, a fixed star wheel assembly comprising an article guide box, a fixed hub on the rear side of said box, bearing means in said hub, a shaft operable in said bearing means and extending beyond said hub, a drive element removably secured to one end of said shaft, a star wheel on the other end of said shaft within said box and shaped to separate articles into groups each including a plurality of articles and deposit a group on each passing carton, a mounting bracket on a fixed part of said machine, a fixed mounting hub on said bracket to telescopically receive the guide box hub, simple set screw means to hold said hubs together whereby said star wheel assembly is removable as a unit by the expedient of releasing said set screw means and taking off said drive element, and forming means adjacent the path of said conveyor to fold each carton about its group of articles.

10. In a group packaging machine having a fixed frame to support a conveyer to carry unfolded cartons in spaced relationship therealong and mechanism to fold each carton about a group of articles after deposition thereon, a star wheel assembly located above the conveyer, said assembly including an article guide box, a star wheel rotatable in said box and shaped to deposit a counted group of articles on each passing carton, mounting means carried by the frame of said machine, and supporting means on said guide box removably engageable with said mounting means whereby the star wheel assembly is removable and replaceable as a unit.

11. In a group packaging machine having a fixed frame to support a conveyer to carry unfolded cartons in spaced relationship therealong and mechanism to fold each carton about a group of articles after deposition thereon, a star wheel assembly located above the conveyor, said assembly including an article guide box, a star wheel rotatable in said box and shaped to deposit a counted group of articles on each passing carton, mounting means carried by the frame of said machine, and supporting means on said guide box removably engageable with said mounting means whereby the star wheel assembly is removable and replaceable as a unit, and resilient braking means extending from said guide box in the path of delivery from said star wheel to align each group of articles with its respective carton.

12. In a group packaging machine having a fixed frame to support a conveyer to carry unfolded cartons in spaced relationship therealong and mechanism to fold each carton about a group of articles after deposition thereon, a star wheel assembly located above the conveyer, said assembly including an article guide box, a star wheel rotatable in said box and shaped to deposit a counted group of articles on each passing carton, a hub on said guide box, bearing means in the guide box hub, a shaft for said star wheel journaled in the guide box hub, and a mounting hub on the frame of said machine for telescopic association with the guide box hub whereby the star wheel assembly is removable and replaceable as a unit.

References Cited in the file of this patent
UNITED STATES PATENTS

| | | |
|---|---|---|
| 1,336,549 | Anderson | Apr. 13, 1920 |
| 2,351,596 | Brogden | June 20, 1944 |
| 2,587,953 | Arneson | Mar. 4, 1952 |
| 2,679,966 | Berch | June 1, 1954 |
| 2,751,730 | Gentry | June 26, 1956 |
| 2,817,196 | Ringler | Dec. 24, 1957 |
| 2,831,300 | Schroeder | Apr. 22, 1958 |
| 2,917,876 | Clapp | Dec. 22, 1959 |